(12) United States Patent
Liu

(10) Patent No.: US 11,452,026 B2
(45) Date of Patent: Sep. 20, 2022

(54) METHOD AND DEVICE FOR TRANSMITTING DATA BY MEANS OF WIRELESS BACKHAUL NETWORK

(71) Applicant: CHINA ACADEMY OF TELECOMMUNICATIONS TECHNOLOGY, Beijing (CN)

(72) Inventor: Jiamin Liu, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 146 days.

(21) Appl. No.: 16/958,506

(22) PCT Filed: Nov. 30, 2018

(86) PCT No.: PCT/CN2018/118692
§ 371 (c)(1),
(2) Date: Jun. 26, 2020

(87) PCT Pub. No.: WO2019/128626
PCT Pub. Date: Jul. 4, 2019

(65) Prior Publication Data
US 2021/0058847 A1     Feb. 25, 2021

(30) Foreign Application Priority Data
Dec. 27, 2017  (CN) .......................... 201711446636.9

(51) Int. Cl.
*H04W 40/22* (2009.01)
*H04W 76/15* (2018.01)
(Continued)

(52) U.S. Cl.
CPC ........... *H04W 40/22* (2013.01); *H04W 24/10* (2013.01); *H04W 76/15* (2018.02); *H04W 80/02* (2013.01); *H04W 88/14* (2013.01); *H04W 92/10* (2013.01)

(58) Field of Classification Search
CPC ..... H04W 40/22; H04W 76/15; H04W 24/10; H04W 80/02; H04W 88/14; H04W 92/10;
(Continued)

(56) References Cited

U.S. PATENT DOCUMENTS

2010/0046418 A1    2/2010  Horn et al.
2010/0272006 A1   10/2010  Bertrand et al.
(Continued)

FOREIGN PATENT DOCUMENTS

CN     101384020 A    3/2009
CN     102132606 A    7/2011
(Continued)

OTHER PUBLICATIONS

Munoz, Raul, et al. "The CTTC 5G end-to-end experimental platform: integrating heterogeneous wireless/optical networks, distributed cloud, and IoT devices." IEEE Vehicular Technology Magazine 11.1 (2016): 50-63. (Year: 2016).*

(Continued)

*Primary Examiner* — Sharad Rampuria
(74) *Attorney, Agent, or Firm* — Meunier Carlin & Curfman LLC

(57) ABSTRACT

Embodiments of the present application provide a method and device for transmitting data by means of a wireless backhaul network, for use in solving the problem in the prior art of inability to implement data transmission of a 5G wireless backhaul network due to that there is no network architecture for the 5G wireless backhaul network at present. In the embodiments of the present application, a terminal is connected to a wired backhaul access station by means of at least one path corresponding to a bearer, and transmits data with the wired backhaul access station by means of the at least one path; there is at least one wireless backhaul access station on any one path, each air interface of the terminal, the
(Continued)

wired backhaul access station, and the wireless backhaul access station respectively corresponds to an underlying protocol combination, and the underlying protocol combination comprises an RLC layer, a MAC layer, and a PHY. The embodiments of the present application provide a network architecture for a 5G wireless backhaul network; a terminal transmits data with a wired backhaul access station by means of at least one path to implement data transmission of the 5G wireless backhaul network, so that the performance of the 5G wireless backhaul network is improved.

18 Claims, 7 Drawing Sheets

(51) Int. Cl.
*H04W 24/10* (2009.01)
*H04W 80/02* (2009.01)
*H04W 88/14* (2009.01)
*H04W 92/10* (2009.01)

(58) Field of Classification Search
CPC . H04W 36/00; H04W 76/12; H04W 36/0011; H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2014/0321282 A1* | 10/2014 | Pragada | H04W 28/10 370/235 |
| 2017/0005913 A1 | 1/2017 | Hampel et al. | |
| 2017/0105164 A1 | 4/2017 | Liu et al. | |
| 2019/0223251 A1 | 7/2019 | Jiang et al. | |

FOREIGN PATENT DOCUMENTS

| | | | | |
|---|---|---|---|---|
| CN | 103888981 A | 6/2014 | | |
| CN | 103988546 A | 8/2014 | | |
| CN | 105578563 A | 5/2016 | | |
| CN | 106538037 A | 3/2017 | | |
| CN | 107302770 A | 10/2017 | | |
| JP | 2013026742 A | 2/2013 | | |
| JP | 2015500605 A | 1/2015 | | |
| JP | 2015092709 A | 5/2015 | | |
| JP | 2020512777 A | 4/2020 | | |
| KR | 20140116090 A | 10/2014 | | |
| KR | 20150053721 A | 5/2015 | | |
| WO | 2013/086410 A2 | 6/2013 | | |
| WO | WO-2014165832 A1 * | 10/2014 | ......... | H04L 12/1407 |
| WO | 2018176416 A1 | 10/2018 | | |

OTHER PUBLICATIONS

Han, Shuangfeng, et al. "Big data enabled mobile network design for 5G and beyond." IEEE Communications Magazine 55.9 (2017): 150 (Year: 2017).*

Ericsson, "Higher layer protocol functions and services," 3GPP TSG-RAN WG2 #94, Tdoc R2-164025, Agenda 9.4.2, Nanjing, P.R. China, May 23-27, 2016, 6 pages.

International Search Report and Written Opinion issued by the International Searching Authority (ISA/CN in PCT Application No. PCT/CN2018/118692 dated Feb. 27, 2019. 8 pages, including English translation of International Search Report.

3GPP TSG-RAN WG3 Meeting #93, "Update on the scenarios of wireless relay," R3-161997, Gothenburg, Sweden, Aug. 22-26, 2016.

AT&T, "Motivation for Study on Integrated Access and Backhaul for NR," RAN#75, A1 9.1, Dubrovnik, Croatia, Mar. 6-9, 2017.

* cited by examiner

US 11,452,026 B2

METHOD AND DEVICE FOR TRANSMITTING DATA BY MEANS OF WIRELESS BACKHAUL NETWORK

CROSS-REFERENCE TO RELATED APPLICATIONS

The present application is a US National Stage of International Application No. PCT/CN2018/118692, filed on Nov. 30, 2018, which claims priority to Chinese Patent Application No. 201711446636.9, filed with the China National Intellectual Property Administration on Dec. 27, 2017 and entitled "Method and Device for Transmitting Data via Wireless Backhaul Network", which is hereby incorporated by reference in its entirety.

FIELD

The present application relates to the field of wireless communication technologies, and particularly to a method and device for transmitting data via a wireless backhaul network.

BACKGROUND

In the future of the mobile communication system, in order to better meet the user demands and greatly increase the network capacity and throughput, the more transmission nodes and the larger transmission bandwidth will be introduced. In the 5G network, the number of access stations has greatly increased, but it cannot be ensured that all access stations have provided with wired backhaul. The introduction of wireless access stations is inevitable. Due to the higher requirement on transmission rate and transmission delay of the 5G, higher demand is proposed for the wireless backhaul.

In the 5G network, most of the nodes at the network side are connected via the wires. That is, the new base stations (NR NodeBs, gNBs) are connected with each other via the wired links, and the gNB and the core network node (e.g., Access and Mobility Management Function (AMF), User Plane Function (UPF) or the like) are also connected with each other via the wired link.

The basic user plane protocol layer in 5G includes Simple DFS Access Protocol (SDAP), Packet Data Convergence Protocol (PDCP), Radio Link Control (RLC), Medium Access Control (MAC) and Physical layer (PHY). The control plane protocol layer includes Non-Access Stratum (NAS), Radio Resource Control (RRC), PDCP, RLC, MAC and PHY The protocol stack architecture of the user plane is as shown in FIG. 1, and the protocol stack architecture of the control plane is as shown in FIG. 2.

However, there is no network architecture for the 5G wireless backhaul at present, and the data cannot be transmitted via the 5G wireless backhaul.

SUMMARY

The invention provides a method and device for transmitting data via wireless backhaul network, so as to solve the problem in the prior art that there is no network architecture for the 5G wireless backhaul at present and the data transmission of the 5G wireless backhaul cannot be achieved.

In a first aspect, an embodiment of the present application provides a method for transmitting data via wireless backhaul network. The method includes:

connecting, by a terminal, with an access station of wired backhaul through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer;

transmitting, by the terminal, data with the access station of wired backhaul through the at least one path.

In a second aspect, an embodiment of the present application provides a method for transmitting data via wireless backhaul network. The method includes:

connecting, by an access station of wired backhaul, with a terminal through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer;

transmitting, by the access station of wired backhaul, data with the terminal through the at least one path.

In a third aspect, an embodiment of the present application provides a method for transmitting data via wireless backhaul network. The method includes:

connecting, by an access station of wireless backhaul located on a path between a terminal and an access station of wired backhaul, with nodes at both ends of the path;

transmitting, by the access station of wireless backhaul, data between the nodes at both ends;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

In a fourth aspect, an embodiment of the present application provides a terminal for transmitting data via wireless backhaul network. The terminal includes: a processor, a memory and a transceiver;

the processor is configured to read a program in the memory and perform the process of:

connecting with an access station of wired backhaul through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and transmitting data with the access station of wired backhaul through the at least one path.

In a fifth aspect, an embodiment of the present application provides an access station of wired backhaul for transmitting data via wireless backhaul network. The access station of wired backhaul includes: a processor, a memory and a transceiver;

the processor is configured to read a program in the memory and perform the process of:

connecting with a terminal through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and transmitting data with the terminal through the at least one path.

In a sixth aspect, an embodiment of the present application provides an access station of wireless backhaul for transmitting data via wireless backhaul network, where the access station of wireless backhaul is located on a path between a terminal and an access station of wired backhaul, and the access station of wireless backhaul includes: a processor, a memory and a transceiver;

the processor is configured to read a program in the memory and perform the process of:

connecting nodes at both ends of the path, and transmitting data between nodes at both ends;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

In a seventh aspect, an embodiment of the present application provides a computer storage medium storing a computer program thereon, where the program implements the method for transmitting data via wireless backhaul network at the terminal side or the method for transmitting data via wireless backhaul network at the access station of wired backhaul side or the method for transmitting data via wireless backhaul network at the access station of wireless backhaul side when executed by a processor.

In the embodiments of the present application, the terminal is connected with the access station of wired backhaul through at least one path corresponding to the bearer, and transmits the data with the access station of wired backhaul through the at least one path, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY. Since the embodiments of the present application propose a network architecture for the 5G wireless backhaul, the terminal transmits the data with the access station of wired backhaul through the at least one path, implementing the data transmission of the 5G wireless backhaul and improving the performance of the 5G wireless backhaul.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

Figure 1:
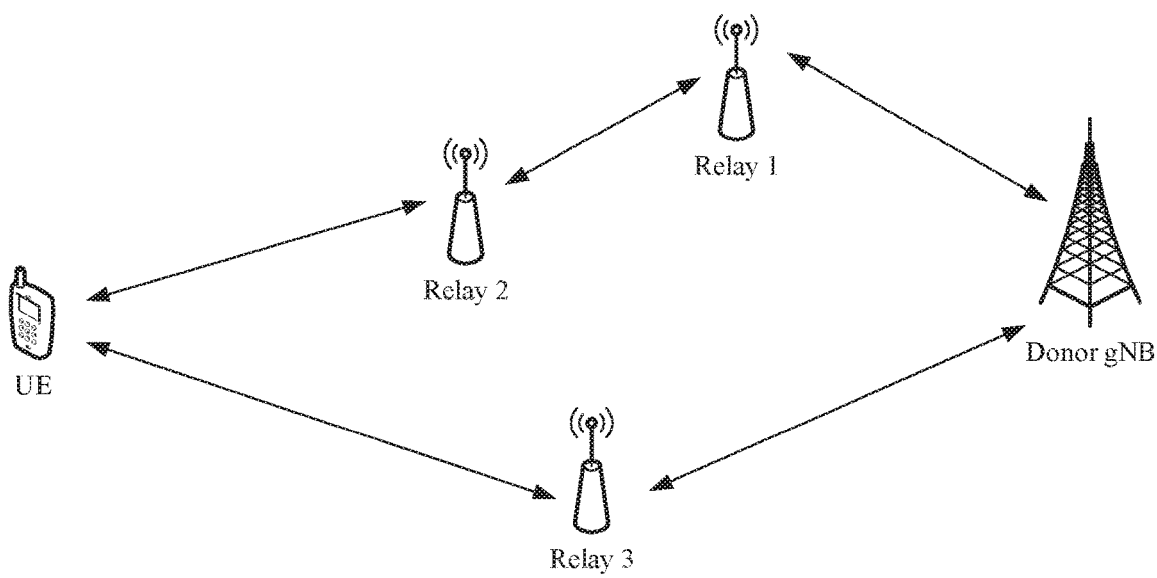
FIG. 1 is a schematic diagram of a network topology according to an embodiment of the present application.

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) The expression of "and/or" describes the association relationship of the associated objects, and indicates that there may be three relationships, for example, A and/or B may represent: only A, both A and B, and only B. The character "/" generally indicates that the associated objects have a kind of "or" relationship.

In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

In the embodiments of the present application, the access network node adopts the basic architecture of L2 separation. The PDCP layer is located at the access station of wired backhaul, and the wireless access station in each hop/each path includes an RLC, an MAC and a PHY for performing consecutive data transmission for the terminal.

The PDCP layer of the access station of wired backhaul and the PDCP layer of the terminal are the peer layers, and maintain the operations such as secure encryption and reordering of the uplink and downlink data respectively.

Here, that the PDCP layer of the terminal and the PDCP layer of the access station of wired backhaul are peer layers, refers to that: a pair of corresponding entities. The downlink data is sent from the PDCP layer of the access station of wired backhaul to the PDCP layer of the terminal; correspondingly, the uplink data is sent from the PDCP layer of the terminal to the PDCP layer of the access station of wired backhaul.

There is no need for the RLC layers located at the access station of wired backhaul and the UE to maintain the in-sequence delivery function, but the RLC of the intermediate wireless node (i.e., access station of wireless backhaul) needs to perform the in-sequence delivery function.

Here, the terminal of the embodiment of the present application may be connected with the access station of wired backhaul through one path, or may be connected with the access station of wired backhaul through multiple paths.

If the terminal is connected with the access station of wired backhaul through multiple paths, the terminal may be directly connected to the access station of wireless backhaul on each of the multiple paths; or may be connected with one access station of wireless backhaul which is connected to the multiple paths.

Here, if the terminal is directly connected to the multiple paths, the terminal performs the path routing operation through the PDCP when it needs to send the uplink data.

These cases will be introduced below respectively.

As shown in FIG. 1 which is a schematic diagram of a network topology, when a 5G UE (terminal) accesses the 5G network, the UE accesses simultaneously through two paths, i.e., UE-Relay2-Relay1-Donor and UE-Relay3-Donor. Here Relay is the access station of wireless backhaul, Donor gNB is the access station of wired backhaul, and the Donor gNB has wired connections with another gNB (5G base station), core network node AMF, UPF, etc. That is, the data of the UE is finally exchanged with and transmitted to the 5G core network via the Donor gNB.

FIG. 1 gives an example where two terminals are connected with the access stations of wireless backhaul of two paths. In this figure, there are two access stations of wireless backhaul in connection on one path, and one access station of wireless backhaul in connection on the other path.

The 5G system supports the multi-hop path because the 5G frequency band has a high-frequency part. For the high-frequency band, its coverage is relatively small and the high-frequency flash phenomenon is easy to occur. While the multi-hop path is more able to ensure the transmission quality, at a cost of an increase in the transmission delay. Thus, when the multi-hop path is considered, the services that are insensitive to the transmission delay is preferred, e.g., typical AM services, with a high requirement on the transmission block error rate and the tolerance of transmission delay up to hundreds of milliseconds.

Multiple access stations of wireless backhaul are set in multiple paths are based on the distance between the terminal and the access station of wired backhaul as well as the specific scenario.

The support of multi-path transmission, on the one hand, can extend the transmission rate of the UE, where the transmission may be performed through two or more transmission paths to expand the transmission bandwidth of the UE when the load on one path is heavy and the transmission rate provided to the UE cannot meet the demand. On the other hand, due to the unstable high-frequency coverage, when one link is breakdown, the UE may easily use another path for transmission, avoiding the risk of the sharp drop in user experience caused by the service transmission interruption.

In order to support multiple network transmission topologies, the embodiments of the present application give multiple network structures.

Figure 2:
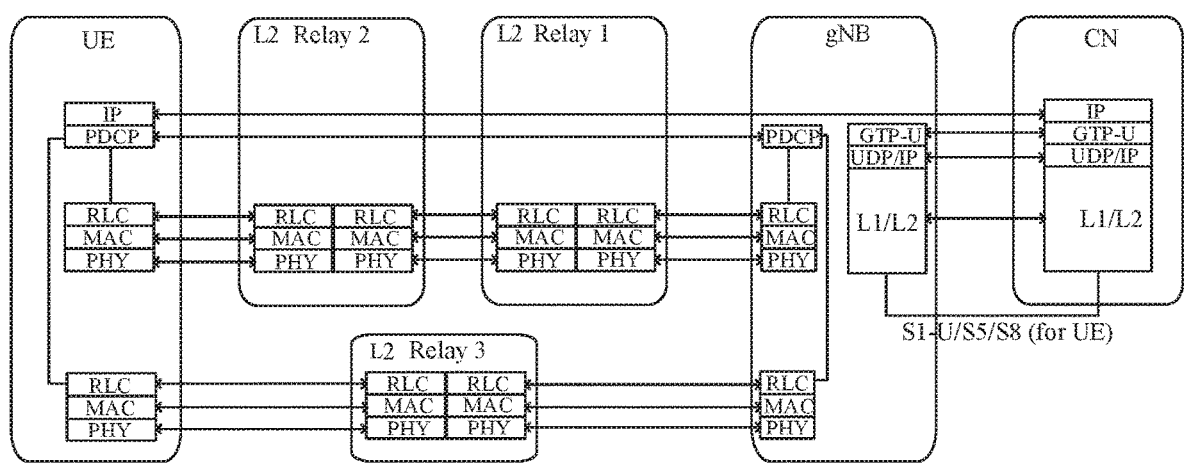
FIG. 2 is a schematic diagram of a first network architecture according to an embodiment of the present application.

1. A schematic diagram of a network architecture provided according to the example of FIG. 1 is as shown in FIG. 2.

In this network architecture diagram, the gNB is a Donor node, which maintains the transmission path between the UE and the core network. The transmission is performed between the gNB and the Core Network (CN) node (AMF or UPF) based on the existing wired transmission network architecture and protocols.

The embodiment of the present application gives the transmission path of one bearer. When the UE has multiple bearers, each bearer performs the similar processing respectively. The example of two paths is given in the bearer transmission of this embodiment. In fact, the similar method may be used to extend to more paths. For this embodiment, two paths are exemplified as one hop and two hops respectively, and similarly, can also be extended to more hops. The architecture may be expanded according to the requirement.

One bearer corresponds to a unique pair of peer PDCP layers, which are respectively located at the UE and the access station of wired backhaul and are responsible for receiving and sending the uplink and downlink data of this bearer, the security operation, the header compression, and the multipath data routing operation.

When the network side configures the bearer separation operation for the bearer, for the PDCP layer, two or more sets of underlying protocol combinations (i.e., RLC, MAC and PHY) may be configured at both the network side and the UE side to support the bearer separation operation.

Here, each set of RLC/MAC/PHY corresponds to one path. It should be noted that the upper layer of the RLC layer located at the access station of wired backhaul and the UE is directly connected to the PDCP layer, while the PDCP layer has the perfect reordering function, so the RLC receiving layer allows the data to be submitted out of order and sorted by the PDCP layer.

For each of the access stations of wireless backhaul, two sets of underlying protocol combinations (i.e., RLC, MAC and PHY) corresponding to the upstream wireless transmission and the downstream wireless transmission respectively need to be configured for the bearer of the UE.

If the terminal is connected with the access station of wired backhaul through at least two paths, the terminal is connected with at least two access stations of wireless backhaul and connected with the access station of wired backhaul through at least one path connected to each of the access stations of wireless backhaul. In FIG. 2, the terminal is connected with Relay2 and Relay3, and each air interface has a set of underlying protocol combination (RLC, MAC, PHY).

Here, the upstream wireless transmission is the transmission in the direction towards the access station of wired backhaul, and the downstream wireless transmission is the transmission in the direction towards the UE. As shown in FIG. 2, two sets of underlying protocol combinations (RLC, MAC, PHY) of the Relay3 correspond to the layer 2 transmissions at the UE side and the access station of wired backhaul side respectively. Two ends of the arrow line in FIG. 2 direct to peer layers.

For example, in the Relay3, the downlink data is received by the upstream RLC layer and then handed over to the downstream RLC layer for subsequent transmission, whereas the uplink data is received by the downstream RLC layer and then handed over to the upstream RLC layer for subsequent transmission. If the RLC layer allows the out-of-order delivery but the ordering of the RLC upper layers lacks in the Relay node, the in-sequence delivery function needs to be enabled in the RLC layer, or a new protocol layer for data sorting is added on the RLC.

Of course, if the transmissions are out of order, they can also be sorted uniformly based on the PDCP receiving layer, but the delay is longer, and the out-of-order accumulation of each hop may cause the overflow problem in PDCP window. The optional mode is to perform the next hop transmission after the sorting is performed for each hop. Whether to sort in the Relay may be configured and performed according to the service requirement. For example, the in-sequence delivery function in the Relay needs to be enabled for the AM (Acknowledgement Mode) service, but may not be enabled for the UM (Un-acknowledgement Mode) service.

In FIG. 2, the Internet Protocol (IP) layer of the UE and the IP layer of the CN are peer layers; and the gNB further includes a GPRS Tunneling Protocol-User (GTP-U) layer, a User Datagram Protocol (UDP)/IP layer, an L1 layer and an L2 layer, which correspond respectively to the GTP-U layer, UDP/IP layer, L1 layer and L2 layer of the CN.

In addition to the network architecture of FIG. 2, if there is a master access station of wired backhaul and a secondary access station of wired backhaul at the network side, the PDCP layer of the terminal is peer to peer with the PDCP layer of the master access station of wired backhaul.

Figure 3:
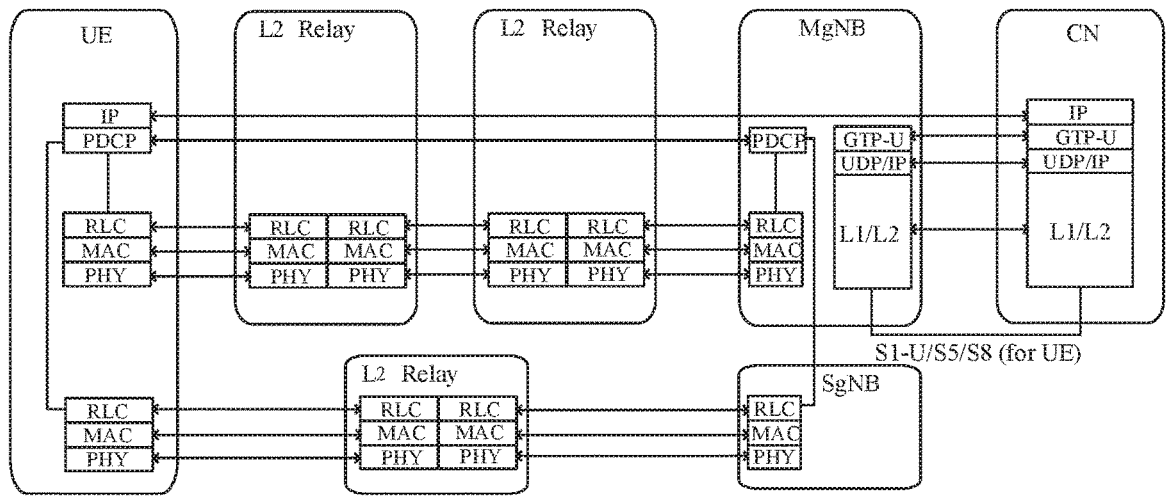
FIG. 3 is a schematic diagram of a second network architecture according to an embodiment of the present application.

As shown in FIG. 3, two Donors gNB end two paths respectively, and the PDCP layer of the master access station of wired backhaul aggregates and distributes the data of the master access station of wired backhaul and the secondary access station of wired backhaul.

Figure 4:
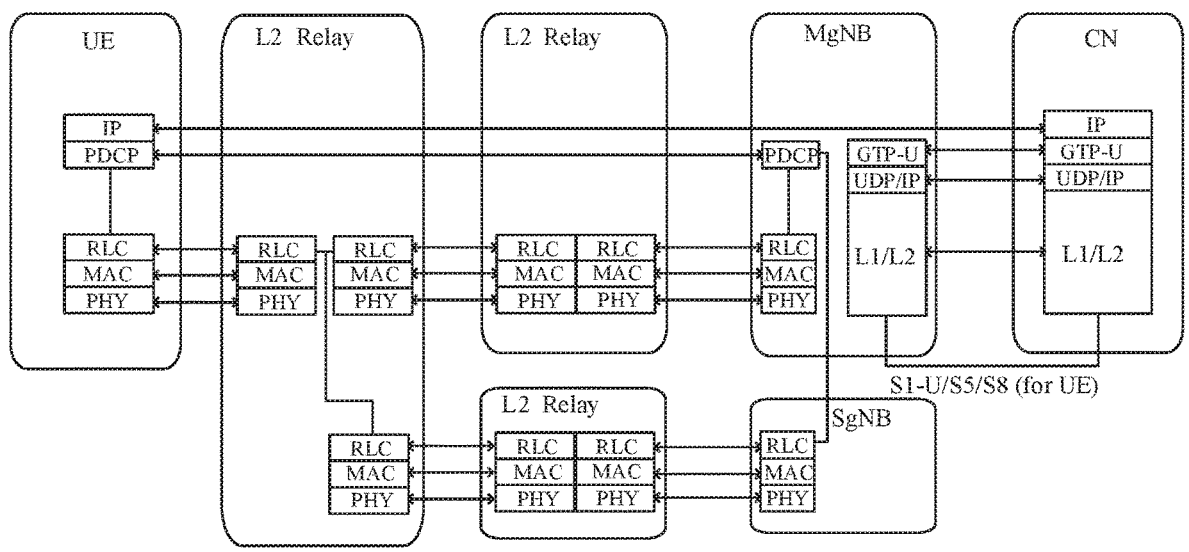
FIG. 4 is a schematic diagram of a third network architecture according to an embodiment of the present application.

There is also a variant architecture: from the view of the UE side, there is one an access station of wireless backhaul, but there are multiple paths from the one access station of wireless backhaul to the access station of wired backhaul, as shown in FIG. 4.

In this way, for the terminal, if the terminal is connected with the access station of wired backhaul through at least two paths, the terminal is connected with one access station of wireless backhaul and connected with the access station of wired backhaul through at least two paths connected to the access station of wireless backhaul. In FIG. 4, the terminal is only connected with Relay2, which is connected with Relay and Relay3 respectively.

It should be noted that FIGS. 2-4 are illustrated by taking the topology diagram of FIG. 1 as an example. The number of paths and the number of access stations of wireless backhaul in one path may be changed according to the requirement, and correspondingly, there will also be adaptive changes in FIGS. 2-4.

Figure 5:
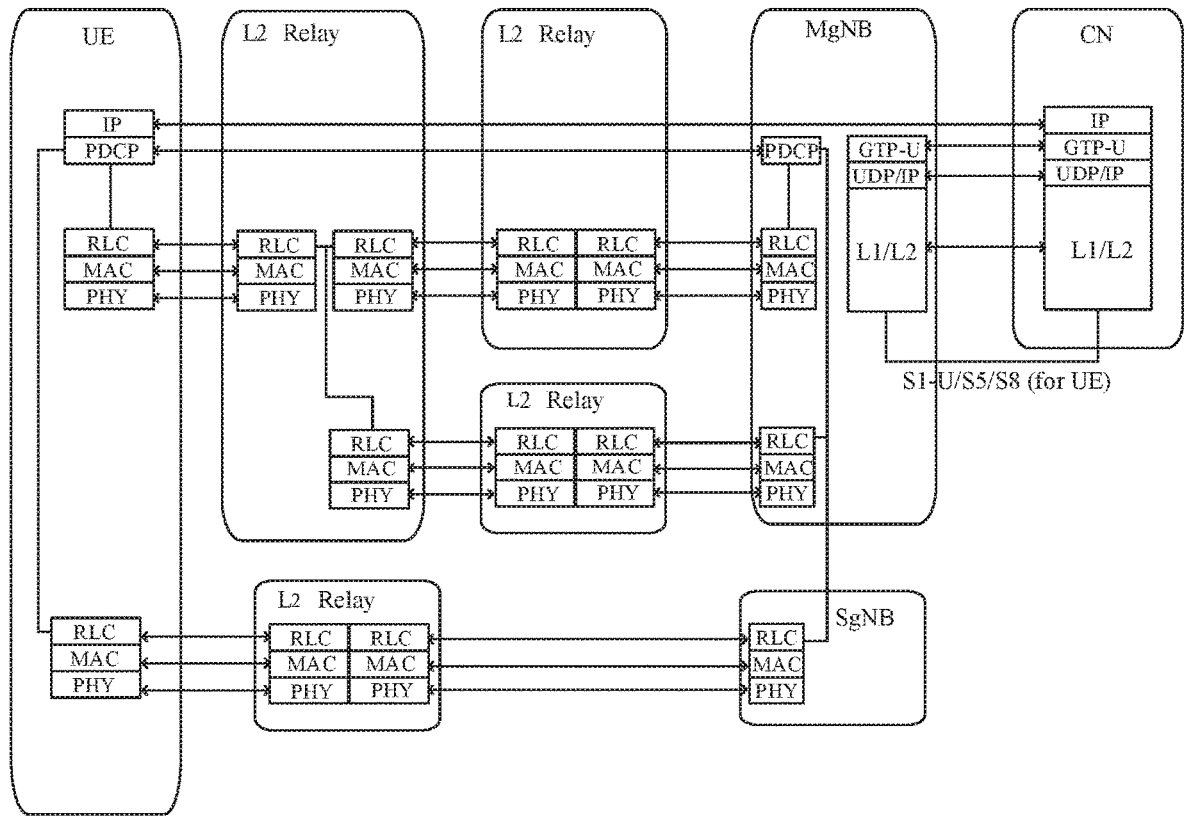
FIG. 5 is a schematic diagram of a fourth network architecture according to an embodiment of the present application.

For example, in FIG. 5, the terminal is connected with the access station of wired backhaul through three paths, two of which terminate directly at the master access station of wired backhaul, while the other path passes through the secondary access station of wired backhaul and ultimately terminates at the master access station of wired backhaul.

Figure 6:
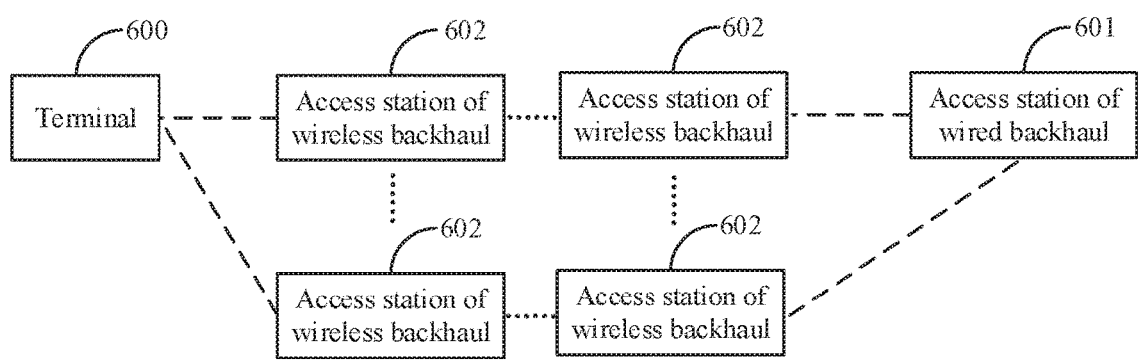
FIG. 6 is a structural schematic diagram of a system for transmitting data via wireless backhaul network according to an embodiment of the present application.

As shown in FIG. 6, a system for transmitting data via wireless backhaul network according to an embodiment of the present application includes:

a terminal 600 configured to connect with an access station of wired backhaul through at least one path corresponding to a bearer, and transmit data with the access station of wired backhaul through the at least one path;

an access station of wired backhaul 601 configured to connect with the terminal through at least one path corresponding to the bearer, and transmit data with the terminal through the at least one path;

an access station of wireless backhaul 602 located on the path between the terminal and the access station of wired backhaul, and configured to connect with the nodes at both ends of the path and transmit data between the nodes at both ends;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

In the embodiments of the present application, the terminal is connected with the access station of wired backhaul through at least one path corresponding to the bearer, and transmits the data with the access station of wired backhaul through the at least one path, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer. Since the embodiments of the present application propose a network architecture for the 5G wireless backhaul, the terminal transmits the data with the access station of wired backhaul through the at least one path, implementing the data transmission via the 5G wireless backhaul and improving the performance of the 5G wireless backhaul.

Here, an air interface of each of the terminal, the access station of wired backhaul and the access station of wireless backhaul corresponds respectively to a set of underlying protocol combination, includes that:

an air interface of each of the terminal corresponds respectively to a set of underlying protocol combination;

an air interface of each of the access station of wired backhaul corresponds respectively to a set of underlying protocol combination;

an air interface of each of the access station of wireless backhaul corresponds respectively to a set of underlying protocol combination.

By taking the access station of wired backhaul as an example, if the access station of wired backhaul has an air interface A, the air interface A of the access station of wired backhaul corresponds to a set of underlying protocol combination; if the access station of wired backhaul further has an air interface B, the air interface A corresponds to a set of underlying protocol combination, and the air interface B corresponds to another set of underlying protocol combination.

For different transmission directions, the access station of wireless backhaul receives and sends data in different directions.

1. After receiving the uplink data, the access station of wireless backhaul sends the uplink data to a next node in the direction towards the access station of wired backhaul of the path.

Here, the next node in the direction towards the wired backhaul access station is an access station of wireless backhaul or an access station of wired backhaul.

The uplink data received by the access station of wireless backhaul is sent from the terminal and needs to be sent to the access station of wired backhaul.

If the access station of wireless backhaul is directly connected with the terminal, the received uplink data is sent by the terminal.

If there is at least one other access station of wireless backhaul between the access station of wireless backhaul and the terminal, the uplink data received by the access station of wireless backhaul is sent by the other access station of wireless backhaul.

If the access station of wireless backhaul is directly connected with the access station of wired backhaul, the access station of wireless backhaul sends the uplink data to the access station of wired backhaul.

If there is at least one other access station of wireless backhaul between the access station of wireless backhaul and the access station of wired backhaul, the access station of wireless backhaul sends the uplink data to the other connected access station of wireless backhaul.

Optionally, the access station of wireless backhaul sorts the received uplink data through the RLC layer and then sends it to the next node in the direction towards the wired backhaul access station on the path.

2. After receiving the downlink data, the access station of wireless backhaul sends the downlink data to a next node in the direction towards the terminal on the path.

Here, the next node in the direction towards the terminal is an access station of wireless backhaul or the terminal.

The downlink data received by the access station of wireless backhaul is sent by the secondary access station of wired backhaul and needs to be sent to the terminal.

If the access station of wireless backhaul is directly connected with the access station of wired backhaul, the received downlink data is sent by the access station of wired backhaul.

If there is at least one other access station of wireless backhaul between the access station of wireless backhaul and the access station of wired backhaul, the downlink data received by the access station of wireless backhaul is sent by the other access station of wireless backhaul.

If the access station of wireless backhaul is directly connected with the terminal, the access station of wireless backhaul sends the downlink data to the terminal.

If there is at least one other access station of wireless backhaul between the access station of wireless backhaul and the terminal, the access station of wireless backhaul sends the downlink data to the connected terminal.

Optionally, the access station of wireless backhaul sorts the received downlink data through the RLC layer and then sends it to the next node in the direction towards the terminal on the path.

For the proposed architecture, the embodiments of the present application provide the establishment process, the reconfiguration process, the exception reporting process and the handover process respectively, which will be described below respectively.

First process: establishment procedure, which includes:

the terminal sends an RRC connection establishment request to the access station of wired backhaul;

correspondingly, the access station of wired backhaul sends the configuration information respectively to the terminal and the access station of wireless backhaul on the path between the access station of wired backhaul and the terminal;

the access station of wireless backhaul establishes the connections with the nodes at both ends of the path according to received configuration information;

the terminal is connected with the access station of wired backhaul through at least one path according to received configuration information.

In the embodiments of the present application, in the architecture based on the layer 2 relay, the peer-to-peer RRC layers are respectively located at the UE and the access station of wired backhaul, that is to say, the control function of the UE is located at the access station of wired backhaul.

When the UE initiates the initial connection, the UE performs the random access to the resident cell capable of initiating the access, and carries the RRC connection establishment request in the random access message 3 (or carries the RRC connection establishment request in other messages).

If the base station receiving the random access message of the UE is an access station of wireless backhaul, then the access station of wireless backhaul has established a transmission path with the appropriate access station of wired backhaul (or has established transmission channels with other access stations of wireless backhaul on the path) in the booting preparation stage, and forwards the RRC connection establishment request of the UE to the access station of wired backhaul through such transmission path. The access station of wired backhaul makes the establishment decision, including the subsequent Signaling Radio Bearer (SRB) establishment and service Data Radio Bearer (DRB) establishment.

In general, the default path is the path used for initial access, and the SRB and DRB can be firstly established through the default path.

In the establishment process, the access station of wired backhaul needs to send an establishment message carrying the relevant configuration information (such as configuration information of L1 and L2, etc.) to the UE, and at the same time, the access station of wired backhaul also needs to send the establishment message carrying the relevant configuration information (such as configuration information of L1 and L2, etc.) to the Relay node(s) (i.e., access station of wireless backhaul(s)) involved in the channel through the message channel between the nodes, e.g., XnAP message, etc.

For example, by taking FIG. 1 as an example, the UE-Relay2-Relay1-Donor is the default path, then the initial paths of the SRB and DRB are both configured as this path. In addition to sending the relevant configuration information to the UE, the access station of wired backhaul needs to send the relevant configuration information to the nodes Relay2 and Relay1. Here the configuration message of each hop may be different, for example, the parameters such as air interface frequency band are different, and there may be different physical layer configurations. However, the service-related configurations need to be the same, for example, the entire link is generally in the AM mode or UM mode.

For a bearer, the establishment of a second path may be performed at the same time as the establishment of the bearer. For example, during the DRB establishment, the large bandwidth transmission or guaranteed transmission is required according to the service requirements, and the measurement result and capability of the UE also show that another path may be supported for transmission at the same time. As such, two paths may be configured when the DRB is established, and the related configurations are sent from the access station of wired backhaul to the UE and each involved access station of wireless backhaul (also called relay node).

The establishment of the second path may also be done by reconfiguration. The DRB is firstly established on the default path, then it is found that the default path cannot meet the requirements or the received measurement result of the UE allows the establishment of the second path, and at this time, the reconfiguration may be performed so that the UE can use two paths for transmission.

The establishment process is illustrated above by taking FIG. 1 as an example. If more paths are established or there are more access stations of wireless backhaul in the path, the specific establishment method is similar to that introduced above and will not be repeated here.

Second process: reconfiguration procedure

The reconfiguration of the transmission path may be divided into two types: one with UE involved and the other is UE free.

1. With UE Involved

After the terminal determines that at least one access station of wireless backhaul connected to itself has changed, the terminal notifies the access station of wired backhaul of the change, or the access station of wired backhaul itself determines that the access station of wireless backhaul on the path between it and the terminal has changed.

Correspondingly, after the access station of wired backhaul determines that the access station of wireless backhaul on the path between it and the terminal has changed (which may be determined by itself or may be notified by the terminal), the access station of wired backhaul sends the configuration information to a new access station of wireless backhaul, and sends the configuration information to the terminal and/or the access station of wireless backhaul connected to the new access station of wireless backhaul.

Specifically, the case with UE involved refers to that UE can know the path change, i.e., the case in which the protocol stack of the UE needs to be changed accordingly.

For example, in the previous example, the path number of the UE changes from one to two, or conversely from two to one. Changing from one path to two paths, means that the second set of RLC/MAC/PHY is newly established, and everything starts from the initial value (established according to the first process). When the establishment is completed, the PDCP starts to distribute the data to this path. Changing from two paths to one path, means that deleting a path. The feedback as to whether the data packet transmission on this path has succeeded, especially for the AM service, is required. For the data packet which fails to be transmitted, the PDCP arranges the retransmission on the existing path and performs the similar data recovery process.

2. UE Free

After determining that the access station of wireless backhaul on the path connected to the terminal has changed, the access station of wired backhaul sends the configuration information to a new access station of wireless backhaul.

The UE free path reconfiguration means that the path connected to the UE is unchanged, while the multi-hop path at the network side needs to be changed due to the link quality or load. For example, the UE-Relay2-Relay1-Donor path needs to be replaced due to the Relay1 failure or other reasons, and may be replaced by the UE-Relay2-Relay4-Donor path. At this time, the link and configuration between the UE and Relay2 may be retained without being affected, and the reconfiguration process in which Relay1 is replaced by Relay4 is completed under the control and configuration of the Donor gNB (that is, the access station of wired backhaul). Due to the replacement of the access station of wireless backhaul, all the layers under the RLC need the operations such as reset and packet deletion, and some data that is not successfully transmitted also needs to be retransmitted on a new path or another path, which can be based on the end-to-end state feedback of the PDCP layer or can introduce a new feedback mechanism of the intermediate segment state.

Third process: exception reporting procedure

Optionally, after connecting with the access station of wired backhaul through at least one path, the terminal performs a part or all of the following processes:

process 1: the terminal performs the link measurement on the path between the terminal and at least one access station of wireless backhaul connected thereto, and reports the result of the link measurement to the connected access station of wireless backhaul;

process 2: the terminal performs the quality measurement on the path between the terminal and at least one access station of wireless backhaul connected thereto, and after determining that the quality meets the deterioration condition according to the result of the quality measurement the terminal reports to the access station of wired backhaul.

The access station of wireless backhaul performs the quality measurement on the path between the nodes at both ends of the path, and after determining that the quality meets the deterioration condition according to the result of the quality measurement access station of wireless backhaul reports to the access station of wired backhaul.

The access station of wired backhaul reconfigures the path between it and the terminal or releasing the path meeting the deterioration condition after receiving the information reported by the terminal or the access station of wireless backhaul when determining that the quality meets the deterioration condition according to the quality measurement result.

Specifically, in the multiple paths with multiple hops of the UE, since there are many involved wireless paths and stations, the corresponding measurements and reports need to be performed continuously. Generally, the link measurement reports are related to scheduling and resources, and this type of report is sent to the station node. Taking FIG. 1 as an example, the UE measures its two wireless links and sends the results to Relay3 and Relay2 respectively for scheduling of the two links.

Meanwhile, the UE also needs to measure the link quality. Taking FIG. 1 as an example, if the quality of link between the UE and Relay3 meets the deterioration condition, the UE needs to report to the access station of wired backhaul, and the access station of wired backhaul reconfigures the link or releases the unusable link through the RRC signaling.

The access station of wireless backhaul also needs to perform measurement and report. Taking FIG. 1 as an example, the Relay3 measures the link between the Relay3 and Donor gNB. When the link quality meets the deterioration condition, there is a need to report, through the Xn interface between the stations, to the Donor gNB for the link reconfiguration or release.

In an implementation, the above-mentioned link measurement and quality measurement may have the same measurement object and measurement quantity, and have the difference in report timing; or may have different measurement objects and measurement quantities, and also have the difference in report timing.

Process 3: the terminal reports to the access station of wired backhaul after there is a path of which the RLC transmission reaches the maximum number of retransmissions.

Correspondingly, the access station of wired backhaul reconfigures the path between it and the terminal or releases the path of which the RLC transmission reaches the maximum number of retransmissions after the terminal reports that there is a path of which the RLC transmission reaches the maximum number of retransmissions.

In each level of transmission, some unrecoverable errors may occur. For example, the RLC transmission of a certain link reaches the maximum number of retransmissions, and the RLC itself cannot solve it at this time and needs to report this situation to the access station of wired backhaul for link configuration and release. The RLC related to the UE is reported by the UE through the RRC signaling, and the RLC between the stations is reported through the inter-node signaling.

Fourth process: handover procedure

The positions of the access station of wired backhaul and the access station of wireless backhaul are generally fixed, while the UE is movable, and the handover needs to occur as the UE moves.

The UE moves out of the coverage of its first hop node due to movement. For example, in FIG. 1, the UE moves out of the coverage of the Relay3 and enters the coverage of a Relay4. If the Relay4 is also connected to the same access station of wired backhaul as the Relay3, that is to say, the UE needs to replace the first hop node but does not need to replace the access station of wired backhaul. The link reconfiguration may be performed at this time, where a new path is configured for the UE, the data recovery process is performed on the PDCP and/or the re-establish process is performed on the underlying protocol combination, while both the security and header compression may continue to be maintained.

That is to say, the terminal performs the PDCP data recovery process on the PDCP layer and/or the re-establish process on the underlying protocol combination when the connected access station of wired backhaul does not change.

In another case, the UE moves out of the coverage of the first hop node, while a new first hop node has no available path to the original access station of wired backhaul, that is, the UE needs to replace the access station of wired backhaul. For example, as shown in the FIG. 1, the UE-Relay3-Donor1 path is no longer available and needs to be replaced with the UE-Relay4-Donor2 path. The Donor node needs to be replaced at this time, then the UE follows the normal handover, the re-establish process needs to performed on the PDCP and the layers under it, and the security and header compression need to be reset.

In a more complicated case, two available first-hop nodes of the UE are connected to different Donor nodes, or a certain first-hop node itself has the path connections to two Donors, so there is a need to select the path with less hop number, more resources and better link quality. Of course, in some special cases, the UE can be connected to two or more Donor nodes, but these Donor nodes also needs to be divided into the Master Donor (i.e., master access station of wired backhaul) and Secondary Donors (i.e., secondary access station of wired backhauls), where the Master Donor is responsible for the main control.

That is to say, the terminal performs the handover after the connected access station of wired backhaul changes, and performs the re-establish process on the PDCP layer and the underlying protocol combination.

Figure 7:
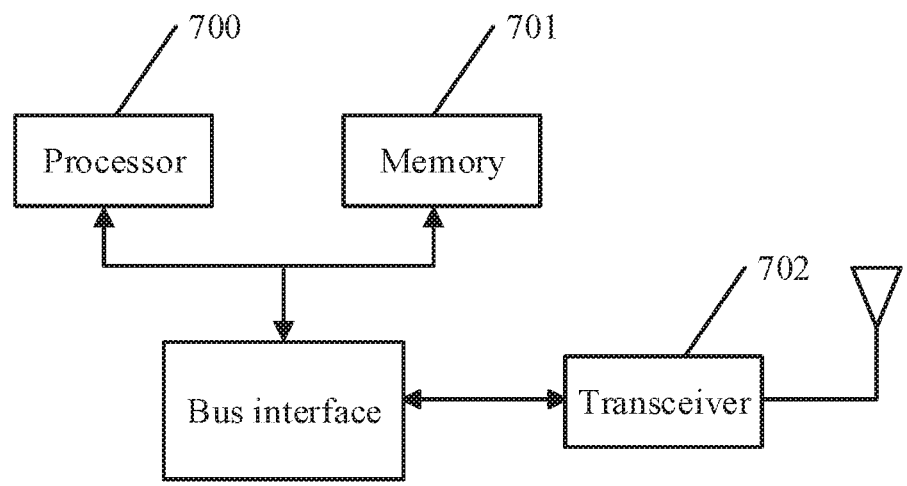
FIG. 7 is a structural schematic diagram of a first terminal according to an embodiment of the present application.

As shown in FIG. 7, a first terminal according to an embodiment of the present invention includes the following.

The processor 700 is responsible for managing the bus architecture and general processing, and the memory 701 may store the data used by the processor 700 when performing the operations. The transceiver 702 is configured to receive and send the data under the control of the processor 700.

The bus architecture may include any numbers of interconnected buses and bridges, and specifically link various circuits of one or more processors represented by the processor 700 and the memory represented by the memory 701. The bus architecture may further link various other circuits such as peripheral device, voltage regulator and power management circuit, which are all well known in the art and thus will not be further described again herein. The bus interface provides an interface. The processor 700 is responsible for managing the bus architecture and general processing, and the memory 701 may store the data used by the processor 700 when performing the operations.

The procedure disclosed by the embodiment of the present application may be applied in the processor 700 or implemented by the processor 700. In the implementation process, each step of the signal processing flow may be completed by the integrated logic circuit of hardware in the processor 700 or the instruction in the form of software. The processor 700 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 701, and the processor 700 reads the information in the memory 701 and completes the steps of the signal processing flow in combination with its hardwares.

Here, the processor 700 is configured to read a program in the memory 701 and perform the process of:

connecting with an access station of wired backhaul through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and transmitting data with the access station of wired backhaul through the at least one path.

Optionally, the PDCP layer of the terminal is peer to peer with the PDCP layer of the access station of wired backhaul.

Optionally, the processor 700 is further configured to:

perform the path routing operation through the PDCP layer.

Optionally, if the processor 700 is connected with the access station of wired backhaul through at least two paths, the processor 700 is connected with one access station of wireless backhaul and connected with the access station of wired backhaul through at least two paths connected to the access station of wireless backhaul; and/or if the processor 700 is connected with the access station of wired backhaul through at least two paths, the processor 700 is connected with at least two access stations of wireless backhaul and connected with the access station of wired backhaul through at least one path connected to each of the access stations of wireless backhaul.

Optionally, the access station of wired backhaul includes a master access station of wired backhaul and a secondary access station of wired backhaul;

the PDCP layer of the terminal is peer to peer with the PDCP layer of the master access station of wired backhaul.

Optionally, the processor 700 is further configured to perform a part or all of the following processes:

process 1: performing link measurement on the path between the terminal and at least one access station of wireless backhaul connected thereto, and reporting the result of the link measurement to the connected access station of wireless backhaul;

process 2: performing quality measurement on the path between the terminal and at least one access station of wireless backhaul connected thereto, and after determining that the quality meets the deterioration condition according to the result of the quality measurement, reporting to the access station of wired backhaul;

process 3: after there is a path of which the RLC transmission reaches the maximum number of retransmissions, reporting to the access station of wired backhaul.

Optionally, the processor 700 is further configured to:

perform the handover procedure after the connected access station of wired backhaul changes, and perform the re-establish process on the PDCP layer and the underlying protocol combination; or perform the PDCP data recovery process on the PDCP layer and/or the re-establish process on the underlying protocol combination when the connected access station of wired backhaul does not change.

Figure 8:
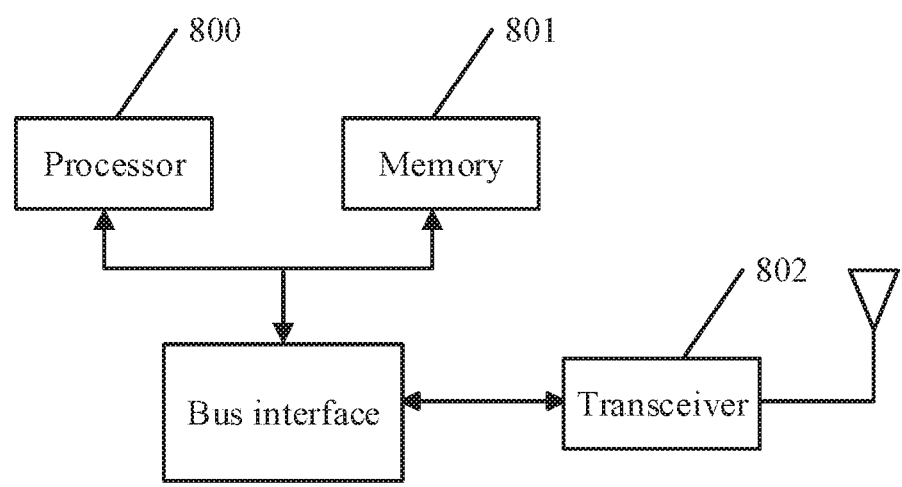
FIG. 8 is a structural schematic diagram of a first access station of wired backhaul according to an embodiment of the present application.

As shown in FIG. 8, a first access station of wired backhaul according to an embodiment of the present application includes the following.

The processor 800 is responsible for managing the bus architecture and general processing, and the memory 801 may store the data used by the processor 800 when performing the operations. The transceiver 802 is configured to receive and send the data under the control of the processor 800.

The bus architecture may include any numbers of interconnected buses and bridges, and specifically link various circuits of one or more processors represented by the processor 800 and the memory represented by the memory 801. The bus architecture may further link various other circuits such as peripheral device, voltage regulator and power management circuit, which are all well known in the art and thus will not be further described again herein. The bus interface provides an interface. The processor 800 is responsible for managing the bus architecture and general processing, and the memory 801 may store the data used by the processor 800 when performing the operations.

The procedure disclosed by the embodiment of the present application may be applied in the processor 800 or implemented by the processor 800. In the implementation process, each step of the signal processing flow may be completed by the integrated logic circuit of hardware in the processor 800 or the instruction in the form of software. The processor 800 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 801, and the processor 800 reads the information in the memory 801 and completes the steps of the signal processing flow in combination with its hardwares.

Here, the processor 800 is configured to read a program in the memory 801 and perform the process of:

connecting with a terminal through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and transmitting data with the terminal through the at least one path.

Optionally, if the access station of wired backhaul is a master access station of wired backhaul, the PDCP layer of the terminal is peer to peer with the PDCP layer of the master access station of wired backhaul.

Optionally, the processor 800 is further configured to:

send the configuration information respectively to the terminal and the access station of wireless backhaul on the path between it and the terminal; or send the configuration information to a new access station of wireless backhaul after determining that the access station of wireless backhaul on the path between it and the terminal changes, and send the configuration information to a terminal and/or an access station of wireless backhaul connected to the new access station of wireless backhaul.

Optionally, the processor 800 is further configured to:

reconfigure the path between it and the terminal or release the path with link quality meeting the deterioration condition, after receiving information reported by the terminal or the access station of wireless backhaul in response to determining that the quality meets the deterioration condition according to the quality measurement result; and/or reconfigure the path between it and the terminal or release the path of which the RLC transmission reaches the maximum number of retransmissions after the terminal reports that there is a path of which the RLC transmission reaches the maximum number of retransmissions.

Optionally, the processor 800 is further configured to:

connect with the terminal through at least one path corresponding to a bearer after determining that the access station of wireless backhaul on the path connected to the terminal changes.

Figure 9:
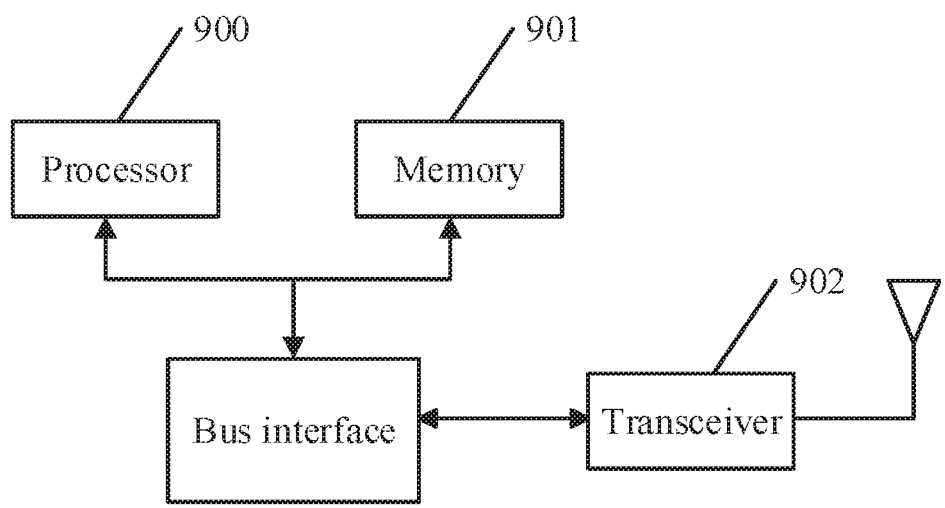
FIG. 9 is a structural schematic diagram of a first access station of wireless backhaul according to an embodiment of the present application.

As shown in FIG. 9, a first access station of wireless backhaul according to an embodiment of the present application includes the following.

The processor 900 is responsible for managing the bus architecture and general processing, and the memory 901 may store the data used by the processor 900 when performing the operations. The transceiver 902 is configured to receive and send the data under the control of the processor 900.

The bus architecture may include any numbers of interconnected buses and bridges, and specifically link various circuits of one or more processors represented by the processor 900 and the memory represented by the memory 901. The bus architecture may further link various other circuits such as peripheral device, voltage regulator and power management circuit, which are all well known in the art and thus will not be further described again herein. The bus interface provides an interface. The processor 900 is responsible for managing the bus architecture and general processing, and the memory 901 may store the data used by the processor 900 when performing the operations.

The procedure disclosed by the embodiment of the present application may be applied in the processor 900 or implemented by the processor 900. In the implementation process, each step of the signal processing flow may be completed by the integrated logic circuit of hardware in the processor 900 or the instruction in the form of software. The processor 900 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 901, and the processor 900 reads the information in the memory 901 and completes the steps of the signal processing flow in combination with its hardwares.

Here, the processor 900 is configured to read a program in the memory 901 and perform the process of:

connecting nodes at both ends of a path, and transmitting data between the nodes;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

Optionally, if the access station of wireless backhaul is connected with the terminal, the access station of wireless backhaul is located on at least one path between the terminal and the access station of wired backhaul.

Optionally, the processor 900 is specifically configured to:

send the uplink data to a next node in the direction towards the access station of wired backhaul on the path after receiving the uplink data, where the next node in the direction towards the access station of wired backhaul is an access station of wireless backhaul or an access station of wired backhaul; and/or send the downlink data to a next node in the direction towards the terminal on the path after receiving the downlink data, where the next node in the direction towards the terminal is an access station of wireless backhaul or the terminal.

Optionally, the processor 900 is specifically configured to:

sort the received uplink data through the RLC layer and then send it to the next node in the direction towards the access station of wired backhaul on the path;

sort the received downlink data through the RLC layer and then send it to the next node in the direction towards the terminal on the path.

Optionally, the processor 900 is further configured to:

establish connections with the nodes at both ends of the path according to received configuration information.

Optionally, the processor 900 is further configured to:

perform the quality measurement on the path between the nodes at both ends of the path, and after determining that the quality meets the deterioration condition according to the result of the quality measurement, report to the access station of wired backhaul.

Figure 10:
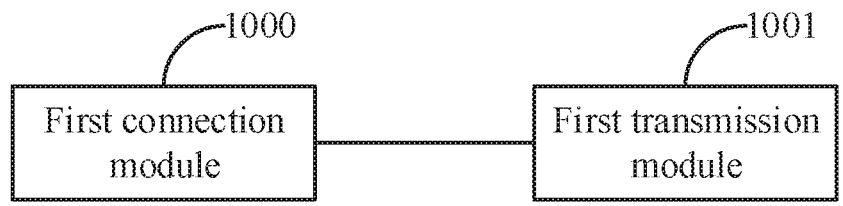
FIG. 10 is a structural schematic diagram of a second terminal according to an embodiment of the present application.

As shown in FIG. 10, a second terminal according to an embodiment of the present application includes:

a first connection module 1000 configured to connect with an access station of wired backhaul through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer;

a first transmission module 1001 configured to transmit data with the access station of wired backhaul through the at least one path.

Optionally, the PDCP layer of the terminal is peer to peer with the PDCP layer of the access station of wired backhaul.

Optionally, the first transmission module 1001 is further configured to:

perform the path routing operation through the PDCP layer.

Optionally, if the first connection module 1000 is connected with the access station of wired backhaul through at least two paths, the first connection module 1000 is connected with one access station of wireless backhaul and connected with the access station of wired backhaul through at least two paths connected to the access station of wireless backhaul; and/or if the first connection module 1000 is connected with the access station of wired backhaul through at least two paths, the first connection module 1000 is connected with at least two access stations of wireless backhaul and connected with the access station of wired backhaul through at least one path connected to each of the access stations of wireless backhaul.

Optionally, the access station of wired backhaul includes a master access station of wired backhaul and a secondary access station of wired backhaul;

the PDCP layer of the terminal is peer to peer with the PDCP layer of the master access station of wired backhaul.

Optionally, the first transmission module 1001 is further configured to perform a part or all of the following processes:

process 1: performing link measurement on the path between the terminal and at least one access station of wireless backhaul connected thereto, and reporting the result of the link measurement to the connected access station of wireless backhaul;

process 2: performing the quality measurement on the path between the terminal and at least one access station of wireless backhaul connected thereto, and after determining that the quality meets the deterioration condition according to the result of the quality measurement, reporting to the access station of wired backhaul;

process 3: after there is a path of which the RLC transmission reaches the maximum number of retransmissions, reporting to the access station of wired backhaul.

Optionally, the first connection module 1000 is further configured to:

perform the handover procedure after the connected access station of wired backhaul changes, and perform the re-establish process on the PDCP layer and the underlying protocol combination; or perform the PDCP data recovery process on the PDCP layer and/or the re-establish process on the underlying protocol combination when the connected access station of wired backhaul does not change.

Figure 11:
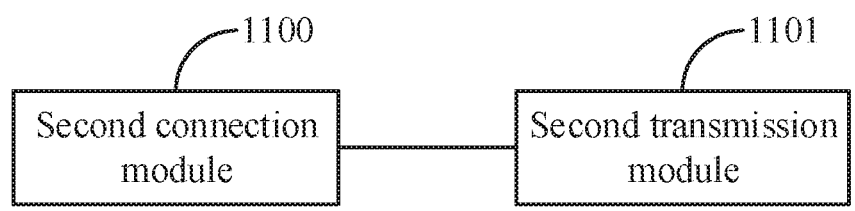
FIG. 11 is a structural schematic diagram of a second access station of wired backhaul according to an embodiment of the present application.

As shown in FIG. 11, a second access station of wired backhaul according to an embodiment of the present application includes:

a second connection module 1100 configured to connect with a terminal through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and a second transmission module 1101 configured to transmit data with the terminal through the at least one path.

Optionally, if the access station of wired backhaul is a master access station of wired backhaul, the PDCP layer of the terminal is peer to peer with the PDCP layer of the master access station of wired backhaul.

Optionally, the second connection module 1100 is further configured to:

send the configuration information respectively to the terminal and the access station of wireless backhaul on a path between it and the terminal; or send the configuration information to a new access station of wireless backhaul after determining that the access station of wireless backhaul on the path between it and the terminal changes, and send the configuration information to a terminal and/or an access station of wireless backhaul connected to the new access station of wireless backhaul.

Optionally, the second connection module 1100 is further configured to:

reconfigure the path between it and the terminal or release the path with link quality meeting the deterioration condition, after receiving information reported by the terminal or the access station of wireless backhaul in response to determining that the quality meets the deterioration condition according to the quality measurement result; and/or reconfigure the path between it and the terminal or release the path of which the RLC transmission reaches the maximum number of retransmissions after the terminal reports that there is a path of which the RLC transmission reaches the maximum number of retransmissions.

Optionally, the second connection module 1100 is further configured to:

connect with the terminal through at least one path corresponding to a bearer after determining that the access station of wireless backhaul on the path connected to the terminal changes.

Figure 12:
FIG. 12 is a structural schematic diagram of a second access station of wireless backhaul according to an embodiment of the present application.

As shown in FIG. 12, a second access station of wireless backhaul according to an embodiment of the present application is located on the path between a terminal and an access station of wired backhaul, and the access station of wireless backhaul includes:

a third connection module 1200 configured to connect with nodes at both ends of the path; and a third transmission module 1201 configured to transmit data between the nodes;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

Optionally, if the access station of wireless backhaul is connected with the terminal, the access station of wireless backhaul is located on at least one path between the terminal and the access station of wired backhaul.

Optionally, the third transmission module 1201 is specifically configured to:

send the uplink data to a next node in the direction towards the access station of wired backhaul on the path after receiving the uplink data, where the next node in the direction towards the access station of wired backhaul is an access station of wireless backhaul or an access station of wired backhaul; and/or send the downlink data to a next node in the direction towards the terminal on the path after receiving the downlink data, where the next node in the direction towards the terminal is an access station of wireless backhaul or the terminal.

Optionally, the third transmission module 1201 is specifically configured to:

sort the received uplink data through the RLC layer and then send it to the next node in the direction towards the access station of wired backhaul on the path;

sort the received downlink data through the RLC layer and then send it to the next node in the direction towards the terminal on the path.

Optionally, the third connection module 1200 is further configured to:

establish connections with the nodes at both ends of the path according to received configuration information.

Optionally, the third connection module 1200 is further configured to:

perform the quality measurement on the path between the nodes at both ends of the path, and after determining that the quality meets the deterioration condition according to the result of the quality measurement, report to the access station of wired backhaul.

An embodiment of the invention provides a computer storage medium, which is a non-volatile storage medium and stores a computer program thereon, where the program implements the above-mentioned method for transmitting data by means of the wireless backhaul at the terminal side when executed by a processor.

An embodiment of the invention provides a computer storage medium, which is a non-volatile storage medium and stores a computer program thereon, where the program implements the above-mentioned method for transmitting data via the wireless backhaul at the access station of wired backhaul side when executed by a processor.

An embodiment of the invention provides a computer storage medium, which is a non-volatile storage medium and stores a computer program thereon, where the program implements the above-mentioned method for transmitting data by means of the wireless backhaul at the access station of wireless backhaul side when executed by a processor.

Based upon the same inventive concept, an embodiment of the invention further provides a method for transmitting data via wireless backhaul network at the terminal side. Since the device corresponding to this method is the terminal in the system for transmitting data by means of the wireless backhaul of the embodiments of the present application and the principle solving the problem of this method is similar to that of the device, the implementations of this method may refer to the implementations of the system, and the repeated description thereof will be omitted here.

Figure 13:
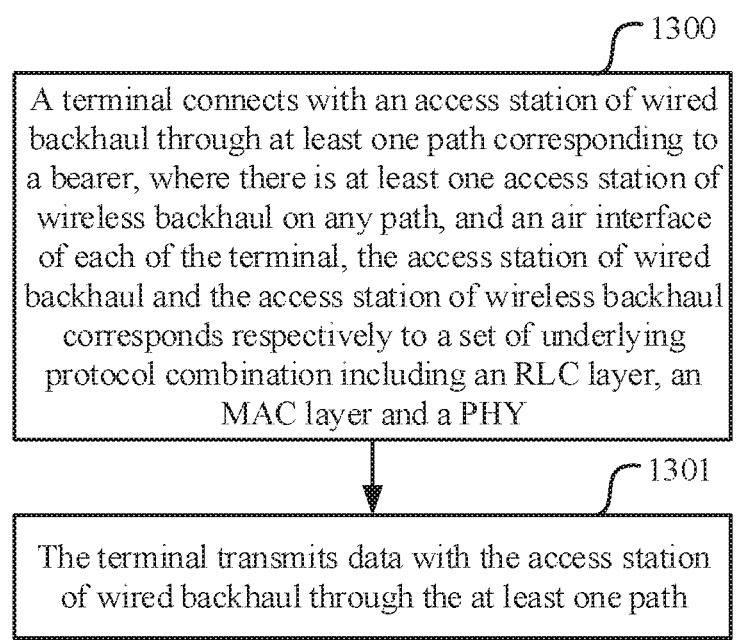
FIG. 13 is a flow schematic diagram of a method for transmitting data via wireless backhaul network at the terminal side according to an embodiment of the present application.

As shown in FIG. 13, the method for transmitting data via the wireless backhaul at the terminal side of the embodiment of the present application includes:

Step 1300: a terminal connects with an access station of wired backhaul through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY; and Step 1301: the terminal transmits data with the access station of wired backhaul through the at least one path.

Optionally, the PDCP layer of the terminal is peer to peer with the PDCP layer of the access station of wired backhaul.

Optionally, the terminal transmits data with the access station of wired backhaul through the at least one path, which further includes:

the terminal performs the path routing operation through the PDCP layer.

Optionally, if the terminal is connected with the access station of wired backhaul through at least two paths, the terminal is connected with one access station of wireless backhaul and connected with the access station of wired backhaul through at least two paths connected to the access station of wireless backhaul; and/or if the terminal is connected with the access station of wired backhaul through at least two paths, the terminal is connected with at least two access stations of wireless backhaul and connected with the access station of wired backhaul through at least one path connected to each of the access stations of wireless backhaul.

Optionally, the access station of wired backhaul includes a master access station of wired backhaul and a secondary access station of wired backhaul;

the PDCP layer of the terminal is peer to peer with the PDCP layer of the master access station of wired backhaul.

Optionally, after connecting with the access station of wired backhaul through at least one path, the terminal performs a part or all of the following processes:

process 1: the terminal performs the link measurement on the path between the terminal and at least one access station of wireless backhaul connected thereto, and reports the result of the link measurement to the connected access station of wireless backhaul;

process 2: the terminal performs the quality measurement on the path between the terminal and at least one access station of wireless backhaul connected thereto, and after determining that the quality meets the deterioration condition according to the result of the quality measurement, the terminal reports to the access station of wired backhaul;

process 3: after there is a path of which the RLC transmission reaches the maximum number of retransmissions, the terminal reports to the access station of wired backhaul.

Optionally, after the terminal connects with the access station of wired backhaul through at least one path, the method further includes:

the terminal performs the switching process after the connected access station of wired backhaul changes, performs the re-establish process on the PDCP layer and the underlying protocol combination, and performs the reset process on the safe operation and head compression; or the terminal performs the PDCP data recovery process on the PDCP layer and/or the re-establish process on the underlying protocol combination when the connected access station of wired backhaul does not change.

Based upon the same inventive concept, an embodiment of the invention further provides a method for transmitting data via wireless backhaul network at the access station of wired backhaul side. Since the device corresponding to this method is the access station of wired backhaul in the system for transmitting data by means of the wireless backhaul of the embodiments of the present application and the principle solving the problem of this method is similar to that of the device, the implementations of this method may refer to the implementations of the system, and the repeated description thereof will be omitted here.

Figure 14:
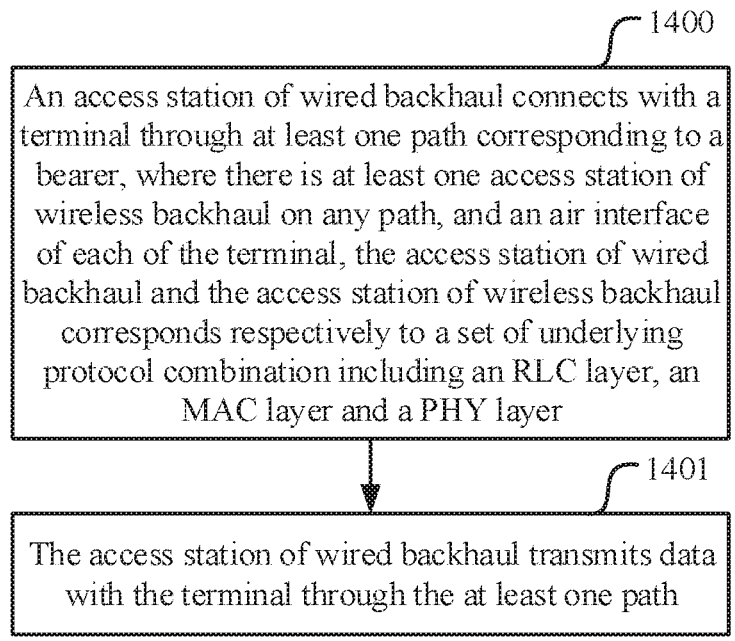
FIG. 14 is a flow schematic diagram of a method for transmitting data via wireless backhaul network at the access station of wired backhaul according to an embodiment of the present application.

As shown in FIG. 14, the method for transmitting data via wireless backhaul network at the access station of wired backhaul side of the embodiment of the present application includes:

Step 1400: an access station of wired backhaul connects with a terminal through at least one path corresponding to a bearer, where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer; and Step 1401: the access station of wired backhaul transmits data with the terminal through the at least one path.

Optionally, if the access station of wired backhaul is a master access station of wired backhaul, the PDCP layer of the terminal is peer to peer with the PDCP layer of the master access station of wired backhaul.

Optionally, before the access station of wired backhaul connects with the terminal through at least one path corresponding to the bearer, the method further includes:

the access station of wired backhaul sends the configuration information respectively to the terminal and the access station of wireless backhaul on the path between it and the terminal; or the access station of wired backhaul sends the configuration information to a new access station of wireless backhaul after determining that the access station of wireless backhaul on the path between it and the terminal changes, and sending configuration information to a terminal and/or an access station of wireless backhaul connected to the new access station of wireless backhaul.

Optionally, after the access station of wired backhaul connects with the terminal through at least one path corresponding to the bearer, the method further includes:

the access station of wired backhaul reconfigures the path between it and the terminal or releases the path meeting the deterioration condition, after receiving information reported by the terminal or the access station of wireless backhaul when determining that the quality meets the deterioration condition according to the quality measurement result; and/or the access station of wired backhaul reconfigures the path between it and the terminal or releases the path of which the RLC transmission reaches the maximum number of retransmissions after the terminal reports that there is a path of which the RLC transmission reaches the maximum number of retransmissions.

Optionally, before the access station of wired backhaul connects with the terminal through at least one path corresponding to the bearer, the method further includes:

the access station of wired backhaul determines that the access station of wireless backhaul on the path connected to the terminal has changed.

Based upon the same inventive concept, an embodiment of the invention further provides a method for transmitting data via wireless backhaul network at the access station of wireless backhaul side. Since the device corresponding to this method is the access station of wireless backhaul in the system for transmitting data by means of the wireless backhaul of the embodiments of the present application and the principle solving the problem of this method is similar to that of the device, the implementations of this method may refer to the implementations of the system, and the repeated description thereof will be omitted here.

Figure 15:
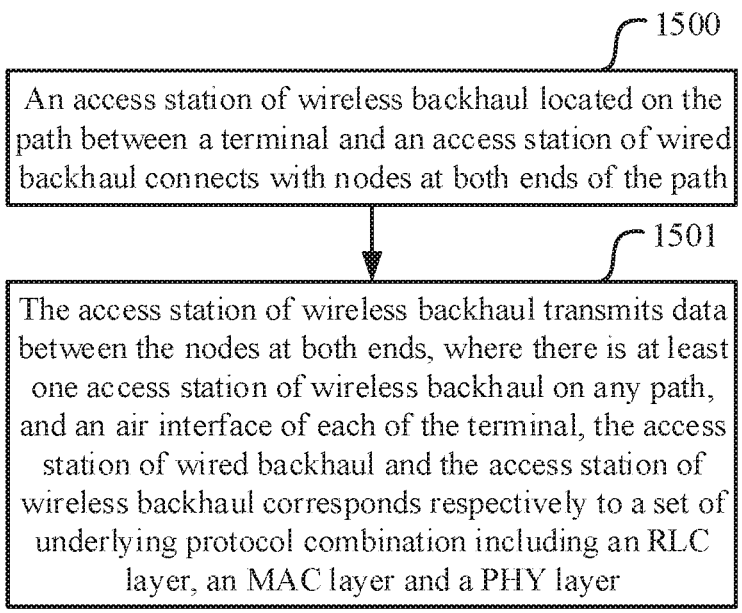
FIG. 15 is a flow schematic diagram of a method for transmitting data via wireless backhaul network at the access station side of wireless backhaul according to an embodiment of the present application.

As shown in FIG. 15, the method for transmitting data by means of the wireless backhaul at the access station of wireless backhaul side of the embodiment of the present application includes:

Step 1500: an access station of wireless backhaul located on the path between a terminal and an access station of wired backhaul connects with nodes at both ends of the path; and Step 1501: the access station of wireless backhaul transmits data between the nodes at both ends;

where there is at least one access station of wireless backhaul on any path, and an air interface of each of the terminal, the access station of wired backhaul and the access station of wireless backhaul corresponds respectively to a set of underlying protocol combination including an RLC layer, an MAC layer and a PHY layer.

Optionally, if the access station of wireless backhaul is connected with the terminal, the access station of wireless backhaul is located on at least one path between the terminal and the access station of wired backhaul.

Optionally, the access station of wireless backhaul transmits data between the nodes at both ends, which includes:

the access station of wireless backhaul sends the uplink data to a next node in the direction towards the access station of wired backhaul on the path after receiving the uplink data, wherein the next node in the direction towards the access station of wired backhaul is an access station of wireless backhaul or an access station of wired backhaul; and/or the access station of wireless backhaul sends the downlink data to a next node in the direction towards the terminal on the path after receiving the downlink data, wherein the next node in the direction towards the terminal is an access station of wireless backhaul or the terminal.

Optionally, the access station of wireless backhaul sends the uplink data to a next node in the direction towards the access station of wired backhaul on the path, which includes:

the access station of wireless backhaul sorts the received uplink data through the RLC layer and then sends it to the next node in the direction towards the access station of wired backhaul on the path;

the access station of wireless backhaul sends the downlink data to a next node in the direction towards the terminal on the path after receiving the downlink data, which includes:

the access station of wireless backhaul sorts the received downlink data through the RLC layer and then sends it to the next node in the direction towards the terminal on the path.

Optionally, the method further includes:

the access station of wireless backhaul establishes connections with the nodes at both ends of the path according to received configuration information.

Optionally, the method further includes:

the access station of wireless backhaul performs the quality measurement on the path between the nodes at both ends of the path, and reports to the access station of wired backhaul after determining that the quality meets the deterioration condition according to the result of the quality measurement.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A method for transmitting data via wireless backhaul network, comprising:

connecting, by a terminal, with an access station of wired backhaul through at least one path corresponding to a bearer, wherein there is at least one access station of wireless backhaul on any path, and an air interface of each of the terminal, the access station of wired backhaul and the access station of wireless backhaul corresponds respectively to a set of underlying protocol combination comprising a Radio Link Control, RLC, layer, a Media access Control, MAC, layer and a physical, PHY, layer; and transmitting, by the terminal, data with the access station of wired backhaul through the at least one path;

wherein after connecting with the access station of wired backhaul through at least one path, the terminal performs a part or all of following processes:

process 2:
the terminal performs a quality measurement on a path between the terminal and at least one access station of wireless backhaul connected thereto, and after determining that the quality meets a deterioration condition according to a result of the quality measurement, the terminal reports to the access station of wired backhaul;

process 3:
after there is a path of which Radio Link Control, RLC, transmission reaches a maximum number of retransmissions, the terminal reports to the access station of wired backhaul, and further wherein, after the terminal is connected with the access station of wired backhaul through at least one path, the method further comprises:

performing, by the terminal, a handover procedure after the connected access station of wired backhaul changes, and performing a re-establish process on a PDCP layer and the underlying protocol combination; or performing, by the terminal, a PDCP data recovery process on the PDCP layer and/or a re-establish process on the underlying protocol combination when the connected access station of wired backhaul does not change.

2. The method according to claim 1, wherein, a Packet Data Convergence Protocol, PDCP, layer of the terminal is peer to peer with a PDCP layer of the access station of wired backhaul.

3. The method according to claim 2, wherein, transmitting, by the terminal, data with the access station of wired backhaul through the at least one path, further comprises:
performing, by the terminal, a path routing operation through the PDCP layer.

4. The method according to claim 1, wherein,
if the terminal is connected with the access station of wired backhaul through at least two paths, the terminal is connected with one access station of wireless backhaul and connected with the access station of wired backhaul through at least two paths connected to the access station of wireless backhaul; and/or
if the terminal is connected with the access station of wired backhaul through at least two paths, the terminal is connected with at least two access stations of wireless backhaul and connected with the access station of wired backhaul through at least one path connected to each of the access stations of wireless backhaul.

5. The method according to claim 1, wherein, the access station of wired backhaul comprises a master access station of wired backhaul and a secondary access station of wired backhaul;
a PDCP layer of the terminal is peer to peer with a PDCP layer of the master access station of wired backhaul.

6. The method according to claim 1, wherein, after connecting with the access station of wired backhaul through at least one path, the terminal further performs:

process 1:
the terminal performs a link measurement on a path between the terminal and at least one access station of wireless backhaul connected thereto, and
the terminal reports a result of the link measurement to the connected access station of wireless backhaul.

7. A method for transmitting data via wireless backhaul network, comprising:
connecting, by an access station of wired backhaul, with a terminal through at least one path corresponding to a bearer, wherein there is at least one access station of wireless backhaul on any path, and an air interface of each of the terminal, the access station of wired backhaul and the access station of wireless backhaul corresponds respectively to a set of underlying protocol combination comprising an RLC layer, an MAC layer and a PHY layer; and
transmitting, by the access station of wired backhaul, data with the terminal through the at least one path;
wherein after the access station of wired backhaul connects with the terminal through at least one path corresponding to the bearer, the method further comprises:
reconfiguring, by the access station of wired backhaul, a path between the access station of wired backhaul and the terminal or releasing a path with link quality meeting a deterioration condition, after receiving information reported by the terminal when determining that the link quality meets the deterioration condition according to a quality measurement result; and/or
reconfiguring, by the access station of wired backhaul, a path between the access station of wired backhaul and the terminal or releasing a path of which RLC transmission reaches a maximum number of retransmissions after the terminal reports that there is a path of which RLC transmission reaches the maximum number of retransmissions, and further wherein, after the terminal is connected with the access station of wired backhaul through at least one path, the method further comprises:
performing, by the terminal, a handover procedure after the connected access station of wired backhaul changes, and performing a re-establish process on a PDCP layer and the underlying protocol combination; or
performing, by the terminal, a PDCP data recovery process on the PDCP layer and/or a re-establish process on the underlying protocol combination when the connected access station of wired backhaul does not change.

8. The method according to claim 7, wherein, if the access station of wired backhaul is a master access station of wired backhaul, a PDCP layer of the terminal is peer to peer with a PDCP layer of the master access station of wired backhaul.

9. The method according to claim 7, wherein, before the access station of wired backhaul connects with the terminal through at least one path corresponding to the bearer, the method further comprises:
sending, by the access station of wired backhaul, configuration information respectively to the terminal and the access station of wireless backhaul on a path between the access station of wired backhaul and the terminal; or
sending, by the access station of wired backhaul, configuration information to a new access station of wireless backhaul after determining that the access station of wireless backhaul on the path between the access station of wired backhaul and the terminal changes, and sending configuration information to a terminal and/or an access station of wireless backhaul connected to the new access station of wireless backhaul.

10. An access station of wired backhaul for transmitting data via wireless backhaul network, comprising: a processor, a memory and a transceiver; wherein, the processor is configured to read a program in the memory and perform a process of the method according to claim 7.

11. The access station of wired backhaul according to claim 10, wherein, if the access station of wired backhaul is a master access station of wired backhaul, a PDCP layer of the terminal is peer to peer with a PDCP layer of the master access station of wired backhaul.

12. The access station of wired backhaul according to claim 10, wherein, the processor is further configured to:

send configuration information respectively to the terminal and the access station of wireless backhaul on a path between the access station of wired backhaul and the terminal; or send configuration information to a new access station of wireless backhaul after determining that the access station of wireless backhaul on the path between the access station of wired backhaul and the terminal changes, and send configuration information to a terminal and/or an access station of wireless backhaul connected to the new access station of wireless backhaul.

13. A terminal for transmitting data via wireless backhaul network, comprising: a processor, a memory and a transceiver;

the processor is configured to read a program in the memory and perform a method comprising:

connecting, with an access station of wired backhaul through at least one path corresponding to a bearer, wherein there is at least one access station of wireless backhaul on any path, and an air interface of each of the terminal, the access station of wired backhaul and the access station of wireless backhaul corresponds respectively to a set of underlying protocol combination comprising a Radio Link Control, RLC, layer, a Media access Control, MAC, layer and a physical, PHY, layer; and transmitting data with the access station of wired backhaul through the at least one path;

wherein after connecting with the access station of wired backhaul through at least one path, the processor is configured to read the program in the memory and perform a part or all of following processes:

process 2:
the terminal performs a quality measurement on a path between the terminal and at least one access station of wireless backhaul connected thereto, and after determining that the quality meets a deterioration condition according to a result of the quality measurement, the terminal reports to the access station of wired backhaul;

process 3:
after there is a path of which Radio Link Control, RLC, transmission reaches a maximum number of retransmissions, the terminal reports to the access station of wired backhaul, and wherein, the processor is further configured to:

perform a handover procedure after the connected access station of wired backhaul changes, and perform a re-establish process on a PDCP layer and the underlying protocol combination; or perform a PDCP data recovery process on the PDCP layer and/or a re-establish process on the underlying protocol combination when the connected access station of wired backhaul does not change.

14. The terminal according to claim 13, wherein, a Packet Data Convergence Protocol, PDCP, layer of the terminal is peer to peer with a PDCP layer of the access station of wired backhaul.

15. The terminal according to claim 14, the processor is further configured to:

perform a path routing operation through the PDCP layer.

16. The terminal according to claim 13, wherein, if the processor is connected with the access station of wired backhaul through at least two paths, the processor is connected with one access station of wireless backhaul and connected with the access station of wired backhaul through at least two paths connected to the access station of wireless backhaul; and/or if the processor is connected with the access station of wired backhaul through at least two paths, the processor is connected with at least two access stations of wireless backhaul and connected with the access station of wired backhaul through at least one path connected to each of the access stations of wireless backhaul.

17. The terminal according to claim 13, wherein, the access station of wired backhaul comprises a master access station of wired backhaul and a secondary access station of wired backhaul;

a PDCP layer of the terminal is peer to peer with a PDCP layer of the master access station of wired backhaul.

18. The terminal according to claim 13, wherein, the processor is further configured to perform:

process 1:
performing a link measurement on a path between the terminal and at least one access station of wireless backhaul connected thereto, and reporting a result of the link measurement to the connected access station of wireless backhaul.

* * * * *